Patented Apr. 21, 1931

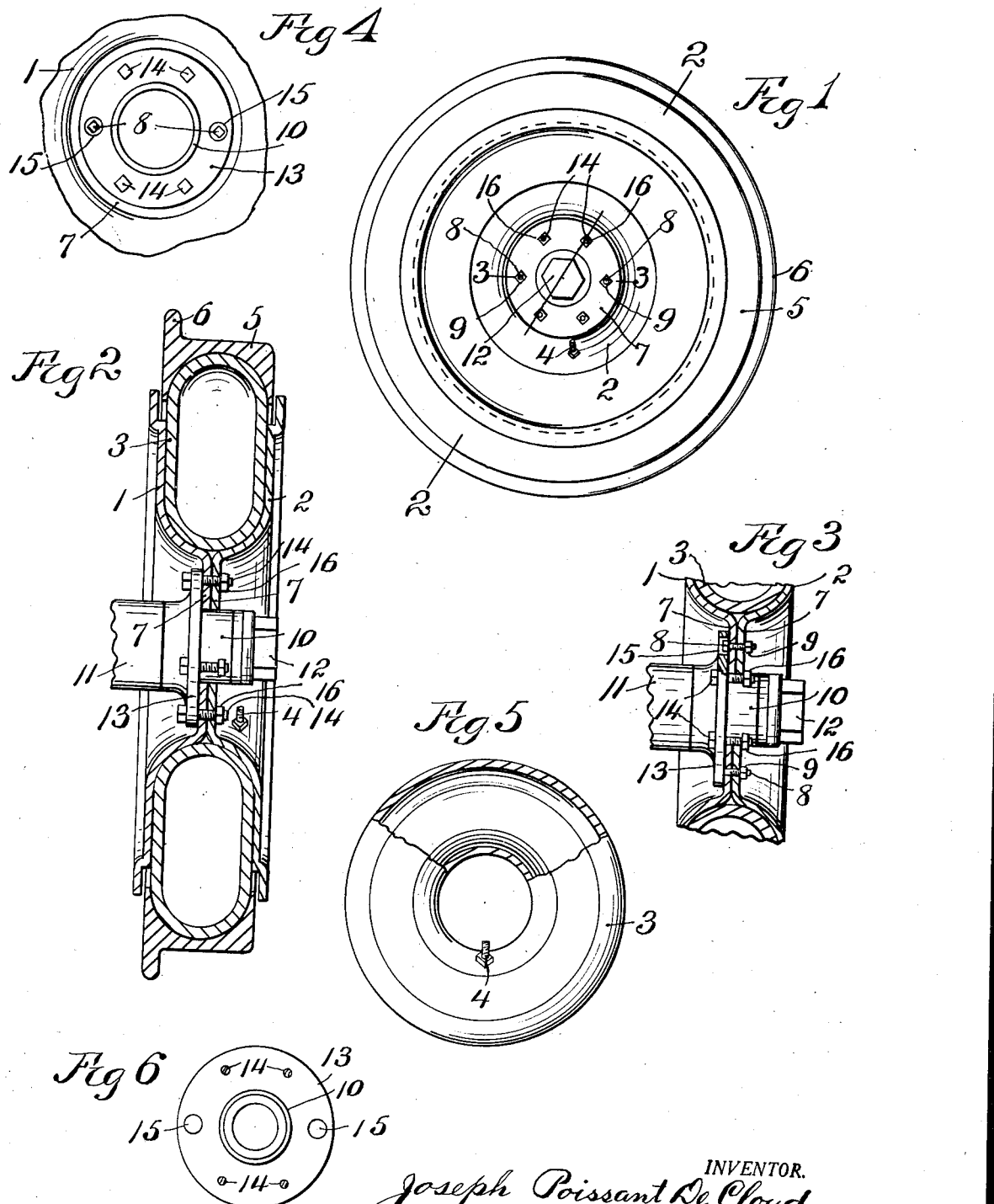

1,801,664

UNITED STATES PATENT OFFICE

JOSEPH POISSANT DE CLOUD, OF KANSAS CITY, MISSOURI

VEHICLE WHEEL

Application filed March 31, 1930. Serial No. 440,436.

My invention relates to improvements in vehicle wheels.

It relates particularly to wheels having pneumatic or resilient tires.

One of the objects of my invention is to provide a novel wheel in which two disk bodies, holding between them a resilient tire, are held clamped together, as a unit, and are adapted to be slipped on and fastened to a wheel hub of usual type, and with the requirement of but a slight modification of the hub to enable such attachment.

A further object of my invention is to provide a pneumatic tire with an exterior tire having a peripheral annular guiding flange, whereby, with the four wheels so equipped, the operator of an automobile may run the car on a street or railway track.

A further object of my invention is to provide a vehicle wheel of the kind described, which is simple, cheap, strong, durable, not likely to get out of order and which will be easy riding.

The novel features of my invention are hereinafter fully described and claimed.

In the accompanying drawing, which illustrates the preferred embodiment of my invention, Fig. 1 is an outside end elevation of my improved vehicle wheel.

Fig. 2 is an enlarged section on the line 2—2 of Fig. 1, the hub and its cap being shown in side elevation.

Fig. 3 is an enlarged section on the line 3—3 of Fig. 1, the hub being shown in side elevation partly broken away.

Fig. 4 is an enlarged inside elevation of the hub and a portion of one disk body.

Fig. 5 is a reduced elevation, partly broken away of the resilient tire.

Fig. 6 is an outside end view, enlarged, of the hub with its cap removed.

Similar reference characters designate similar parts in the different views.

1 and 2 designate respectively the inner and outer ring disk bodies of the wheel, said bodies being arranged to hold and clamp between them a resilient tire 3, which, as shown, is tubular and inflatable, being provided with the usual air filling tube 4, which extends through a hole provided through the outer disk body 2. If desired, the tire 3, which projects outside beyond the peripheries of the disk bodies 1 and 2, may have removably mounted on it an outer rigid tire 5, preferably of metal and having an inner annular groove in which is fitted the periphery of the tire 3.

The outer side of the tire 5 is provided with an annular radial peripheral flange 6, disposed at the inner side edge of the tread of the tire and adapted to engage and be guided by the inner side of the ball of a track rail, not shown.

Upon deflation of the inner tire 3, the outer tire 5 may be mounted in or removed from its operative position on the inner tire, the disk body 2 having been detached from the body 1.

The disk bodies 1 and 2 are each provided with an annular flat central radial portion 7 provided with a circular row of holes therethrough, two of which are adapted to have respectively extended through them two bolts 8, the heads of which bear against the body 1. On the other ends of the bolts 8 are nuts 9 which bear against the flat portion 7 of the disk body 2.

10 designates the body of a hub adapted to be mounted in the usual manner on an axle 11, and provided with a hub cap 12.

The hub 10 has an annular peripheral flange 13 carrying outwardly extending threaded studs 14 adapted to be respectively extended through the holes in the central portions 7 not occupied by the bolts 8, Fig. 2.

The hub 10 is of usual type having the annular flange 13 and the threaded studs 14 in the flange. To enable the use of my improvement therewith, it is but needed to remove two of the studs 14 and enlarge the holes in the flange from which the two studs were removed, as designated by 15 in Figs. 3, 4 and 6.

The enlarged holes 15 respectively receive the heads of the bolts 8 which fasten together the disk bodies 1 and 2.

To mount the disk bodies 1 and 2, having clamped between them the tire 3, on the hub 10, the bodies are slipped onto the body 10 of the hub with the disk body 1 bearing against the flange 13, and the heads of the bolts 8 inserted in the enlarged holes 15 in the flange 13, and the studs 14 respectively extended through the holes in the central flat portions 7 of the disk bodies 1 and 2. The nuts 16 are then respectively mounted on the studs 14 and clamp against the outer side of the disk body 2.

By reversing this operation the disk bodies 1 and 2 and the tire 3 carrying the tire 5 may be removed from the hub 10.

As shown, the inner peripheral groove in the tire 5 is arcuately concave in cross section, to fit the periphery of the tire 3.

The disk bodies 1 and 2 have their peripheral portions overlapping opposite sides respectively of the tire 5, Figs. 1 and 3, thus preventing throwing off of the tire 5 when rounding curves, or should the tire 3 become deflated. To remove the tire 5, the disk body 2 is removed, after removal of the nuts 9 and 16, and the tire 3 is deflated.

When the tire 5 is removed, the wheel may be employed in the usual manner for travel on streets or highways.

I do not limit my invention to the structure shown and described, as modifications, within the scope of the appended claim, may be made without departing from the spirit of my invention.

What I claim is:—

In a vehicle wheel, two ring disk bodies adapted to removable mounting on and attachment to a wheel hub, releasable means for attaching together the said disk bodies independently of said hub, a resilient tire held between and projecting outwardly a substantial distance beyond said disk bodies, and an outer rigid tire removably mounted on the periphery of said resilient tire and having its sides respectively overlapped by said disk bodies and radially movable therebetween, and provided with an annular peripheral radial flange at the inner side edge of the tread of the tire and adapted to engage and be guided by the ball of a track rail.

In testimony whereof I have signed my name to this specification.

JOSEPH POISSANT DE CLOUD.